United States Patent
Sun et al.

(10) Patent No.: US 10,805,170 B1
(45) Date of Patent: *Oct. 13, 2020

(54) WIRELESS NETWORK PERFORMANCE MONITORING AND SECTOR ASSIGNMENT

(71) Applicant: Facebook, Inc., Menlo Park, CA (US)

(72) Inventors: Fan Sun, Fremont, CA (US); Yanzi Zhu, Chicago, IL (US); Ying Li, Menlo Park, CA (US); Djordje Tujkovic, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/355,776

(22) Filed: Mar. 17, 2019

Related U.S. Application Data (63) Continuation-in-part of application No. 16/210,316, filed on Dec. 5, 2018, now Pat. No. 10,652,752, which is a continuation of application No. 15/338,338, filed on Oct. 29, 2016, now Pat. No. 10,181,980.

(51) Int. Cl.
| | |
|---|---|
| *H04W 16/10* | (2009.01) |
| *H04L 12/24* | (2006.01) |
| *H04W 72/08* | (2009.01) |
| *H04W 84/00* | (2009.01) |
| *H04W 72/04* | (2009.01) |
| *H04W 40/16* | (2009.01) |

(52) U.S. Cl.
CPC .......... *H04L 41/12* (2013.01); *H04L 41/0816* (2013.01); *H04L 41/0893* (2013.01); *H04W 16/10* (2013.01); *H04W 72/0446* (2013.01); *H04W 72/082* (2013.01); *H04W 84/00* (2013.01); *H04W 40/16* (2013.01)

(58) Field of Classification Search
CPC .............. H04W 16/10; H04W 72/082; H04W 84/18–22; H04L 41/0816
See application file for complete search history.

(56) References Cited

U.S. PATENT DOCUMENTS

| | | | |
|---|---|---|---|
| 9,363,651 | B1 | 6/2016 | daCasta |
| 10,181,980 | B2 * | 1/2019 | Ahmed ................. H04W 40/16 |
| 10,652,752 | B2 * | 5/2020 | Ahmed ............. H04W 72/0446 |
| 2004/0259563 | A1 * | 12/2004 | Morton ................. H04W 16/10 |
| | | | 455/452.2 |
| 2005/0232179 | A1 | 10/2005 | daCasta |

(Continued)

*Primary Examiner* — Hoon J Chung
(74) *Attorney, Agent, or Firm* — Brian R. Short (57) ABSTRACT

Apparatuses, methods, and systems for monitoring performance of a wireless network and assigning sectors of nodes of the wireless network are disclosed. A method includes monitoring a performance of links between sectors of wireless nodes of the wireless network, assigning or reassigning sectors of the wireless nodes to operate in a first mode based on the monitored performance of the links, wherein all of the sectors operating in the first mode are configured to transmit signals or simultaneously receive signals, and assigning or reassigning sectors of the plurality of wireless nodes to operate in a second mode based on the monitored performance of the links, wherein all of the sectors operating in the second mode are configured to transmit signals when all of the sectors operating in the first mode are receiving signals, or receive signals when all of the sectors operating in the first mode are transmitting signals.

18 Claims, 5 Drawing Sheets

(56) References Cited

U.S. PATENT DOCUMENTS

2006/0251115 A1    11/2006   Hague et al.
2012/0188901 A1     7/2012   Struhsaker et al.
2017/0111164 A1     4/2017   Wyville

* cited by examiner

FIGURE 5

WIRELESS NETWORK PERFORMANCE MONITORING AND SECTOR ASSIGNMENT

RELATED PATENT APPLICATIONS

This patent application is a continuation-in-part of U.S. patent application Ser. No. 16/210,316 filed on Dec. 5, 2018, which is a continuation of U.S. patent application Ser. No. 15/338,338 filed on Oct. 29, 2016, and Granted as U.S. Pat. No. 10,181,980.

FIELD OF THE DESCRIBED EMBODIMENTS

The described embodiments relate generally to wireless communications. More particularly, the described embodiments relate to systems, methods and apparatuses for monitoring performance of a wireless network and assigning modes of operation to sectors of nodes of the wireless network.

BACKGROUND

Multi-hop wireless networks include multiple nodes wherein wireless links are formed between the nodes. Multi-hop networks are susceptible to self-interference between the wireless links of the nodes of the multi-hop networks. Multi-hop wireless networks that include a single transmission channel can be particularly susceptible to interference between wireless links.

It is desirable to have methods, apparatuses, and systems for monitoring, characterizing a wireless mesh network, and selecting sectors of nodes within the wireless mesh network to each operate in a first mode or in a second mode.

SUMMARY

An embodiment includes a method. The method includes monitoring a performance of wireless links between a plurality of sectors of a plurality of wireless nodes of a wireless network, assigning or reassigning a first plurality of sectors of the plurality of wireless nodes of the wireless network to operate in a first mode based on the monitored performance of the wireless links, wherein all of the first plurality sectors operating in the first mode are configured to simultaneously transmit wireless signals or simultaneously receive wireless signal, and assigning or reassigning a second plurality of sectors of the plurality of wireless nodes of the wireless network to operate in a second mode based on the monitored performance of the wireless links, wherein all of the second plurality of sectors operating in the second mode are configured to simultaneously transmit wireless signals when all of the first plurality of sectors operating in the first mode are receiving wireless signals, or simultaneously receive wireless signals when all of the first plurality of sectors operating in the first mode are transmitting wireless signals.

Another embodiment includes a wireless network. The wireless network includes a plurality of wireless nodes, and a controller. The controller is operative to monitor performances of wireless links between sectors of the plurality of wireless nodes of the wireless network, assign or reassign a first plurality of sectors of the plurality of wireless nodes of the wireless network to operate in a first mode based on the monitored performance of the wireless links, wherein all of the first plurality of sectors operating in the first mode are configured to simultaneously transmit wireless signals or receive wireless signals, and assign or reassign a second plurality of sectors of the plurality of wireless nodes of the wireless network to operate in a second mode based on the monitored performance of the wireless links, wherein all of the second plurality of sectors operating in the second mode are configured to simultaneously transmit wireless signals when all of the first plurality of sectors operating in the first mode are receiving wireless signals, or receive wireless signals when all of the first plurality of sectors operating in the first mode are transmitting wireless signals.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for monitoring and characterizing a wireless network and selecting sectors of nodes of the wireless network to operate in a first mode or a second mode based on the wireless network monitoring. For at least some embodiments, the sectors of the nodes operating in the first mode are configured to simultaneously transmit wireless signals or simultaneously receive wireless signals. Further, all the sectors selected to operate in the second mode are configured to simultaneously transmit wireless signals when all of the sectors operating in the first mode are receiving wireless signals, or all the sectors selected to operate in the second mode are configured to simultaneously receive wireless signals when all of the sectors operating in the first mode are transmitting wireless signals. For at least some embodiments, the sector selection are based on the monitoring and characterizing of the wireless network to reduce or minimize interference between wireless links formed between the sectors of the wireless network.

Figure 1:
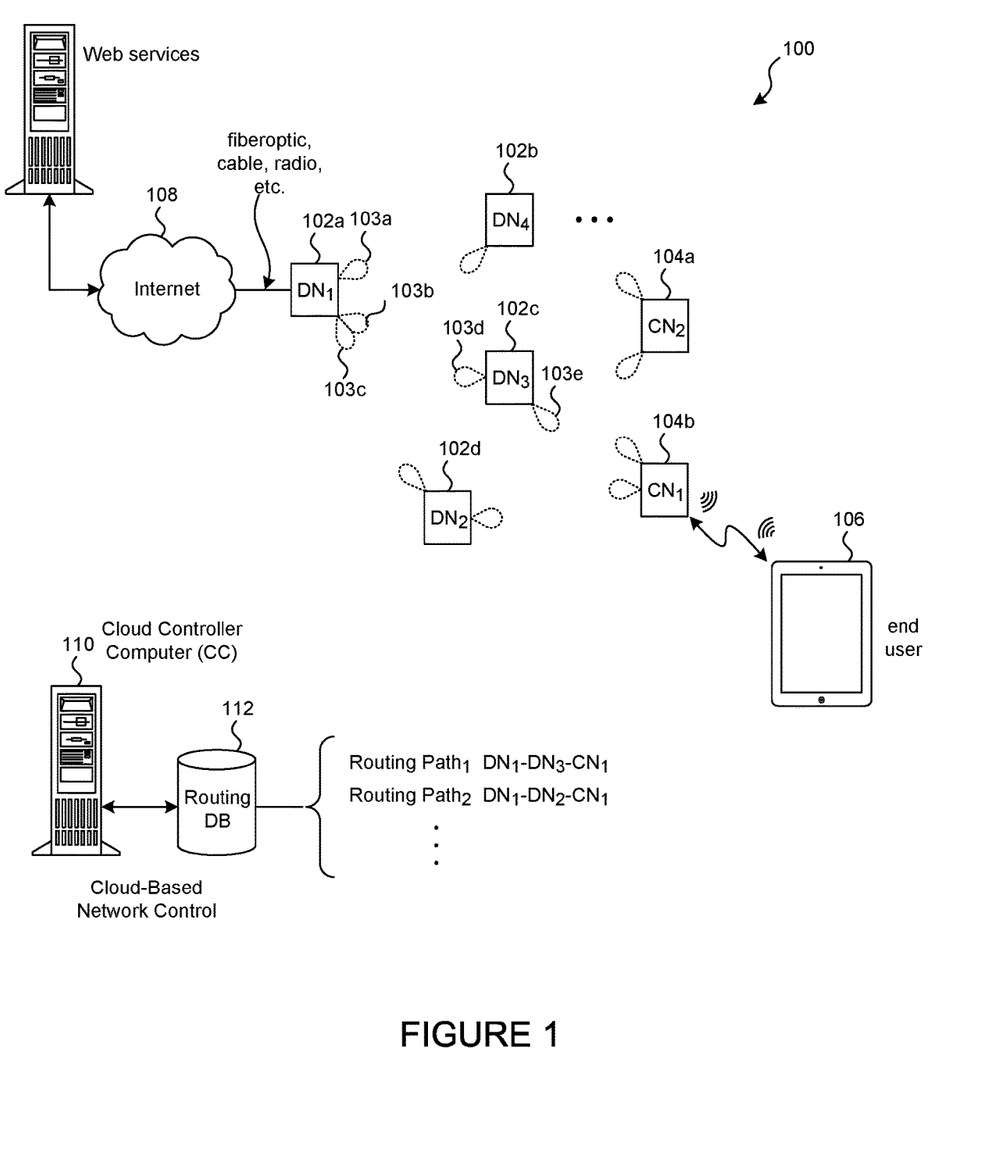
FIG. 1 shows a wireless mesh network, according to an embodiment.

FIG. 1 shows a point-to-point wireless communication network, according to an embodiment. The network 100 includes a number of destination nodes (DN) 102a, 102b, 102c, 102d, etc. and a number of client nodes (CN) 104a, 104b, which can all be more generally referred to as nodes. The destination nodes transmit IP packets between themselves and the client nodes. The client nodes transmit and receive IP packets between themselves and the destination nodes as well as to a number of end users 106 (such as, but not limited to, wireless enabled devices including computers, tablets, smart phones, household appliances, or any other device capable of transmitting and receiving wireless IP data). For an embodiment, the destination nodes 102 are typically mounted on utility poles or on buildings and transmit point-to-point wireless signals approximately 200-

300 meters, depending on conditions. The client nodes 104 are generally located in retail/office establishments or in homes in order to transmit and receive IP packets to and from the end users. In one embodiment, the IP packets are sent according to a standardized protocol such as IEEE 802.11ad. However, it will be appreciated that any number of other IP protocols such as WiMAX 802.16 could be used.

In the network 100, at least one destination node (e.g., node 102*a*) is coupled to a physical cable that carries IP data to and from a computer communication link 108 (e.g., the Internet or a private communication link). IP packets that are destined for an end user 106 are received from the communication link and are transmitted via one or more routes to the client node 104*b*, which is in communication with the end user 106. For example, packets may be sent via a route including nodes $DN_1 \rightarrow DN_3 \rightarrow CN_1$ or via a second route including nodes $DN_1 \rightarrow DN_2 \rightarrow CN_1$ depending on the radio frequency path conditions that may exist at any time.

In one embodiment, transmissions are carried on a non-regulated 60 GHz radio frequency spectrum band. At these frequencies, the ability to transmit and receive packets is easily influenced by changing atmospheric conditions (wind, rain, etc.) or by interfering objects (e.g., buses, tree limbs, or other objects passing in and out of the line of sight). Therefore, the best route to complete a communication link between a transmitting and a receiving node in the network may change over time.

In the embodiment shown, a cloud controller computer 110 includes a database 112 that stores a list of possible routes that have been determined to complete a communication link between the various nodes of the network. The cloud computer 110 can communicate with each of the nodes by sending packets that are addressed to the nodes in order to control the overall operation of the network. In one embodiment, when an IP packet is to be sent to an end user on the network, the cloud computer informs the nodes which route to use.

In order to improve the communication path between each of the nodes, to reduce interference, and to increase the throughput of the network, for an embodiment, the destination and client nodes generally include multiple antennas that can be used to control the transmit and receive directions of the node by beamforming. The radio frequency signals transmitted by each of the antennas can be selectively delayed by beamforming techniques in order to direct the main lobe (i.e., the bulk of the transmitted signal power) in a desired direction. Similarly, signals received by the antennas can be delayed and summed using beamforming techniques to change the effective listening direction of the receiver. In the embodiment shown in FIG. 1, destination node $DN_1$ 102*a* can beamform its transmitted and received signals in a number of different directions 103*a*, 103*b*, 103*c*. Similarly destination node $DN_3$ 102*c* can beamform its transmitted and received signals in directions 103*d* and 103*e*. The best communication link between destination nodes $DN_1$ and $DN_3$ is determined by selecting the best transmit and receive beamforming directions for each node in order to complete the communication link. The best communication link between nodes may not always be when the transmit and receive beamforming directions are aligned along the line of sight.

Figure 2:
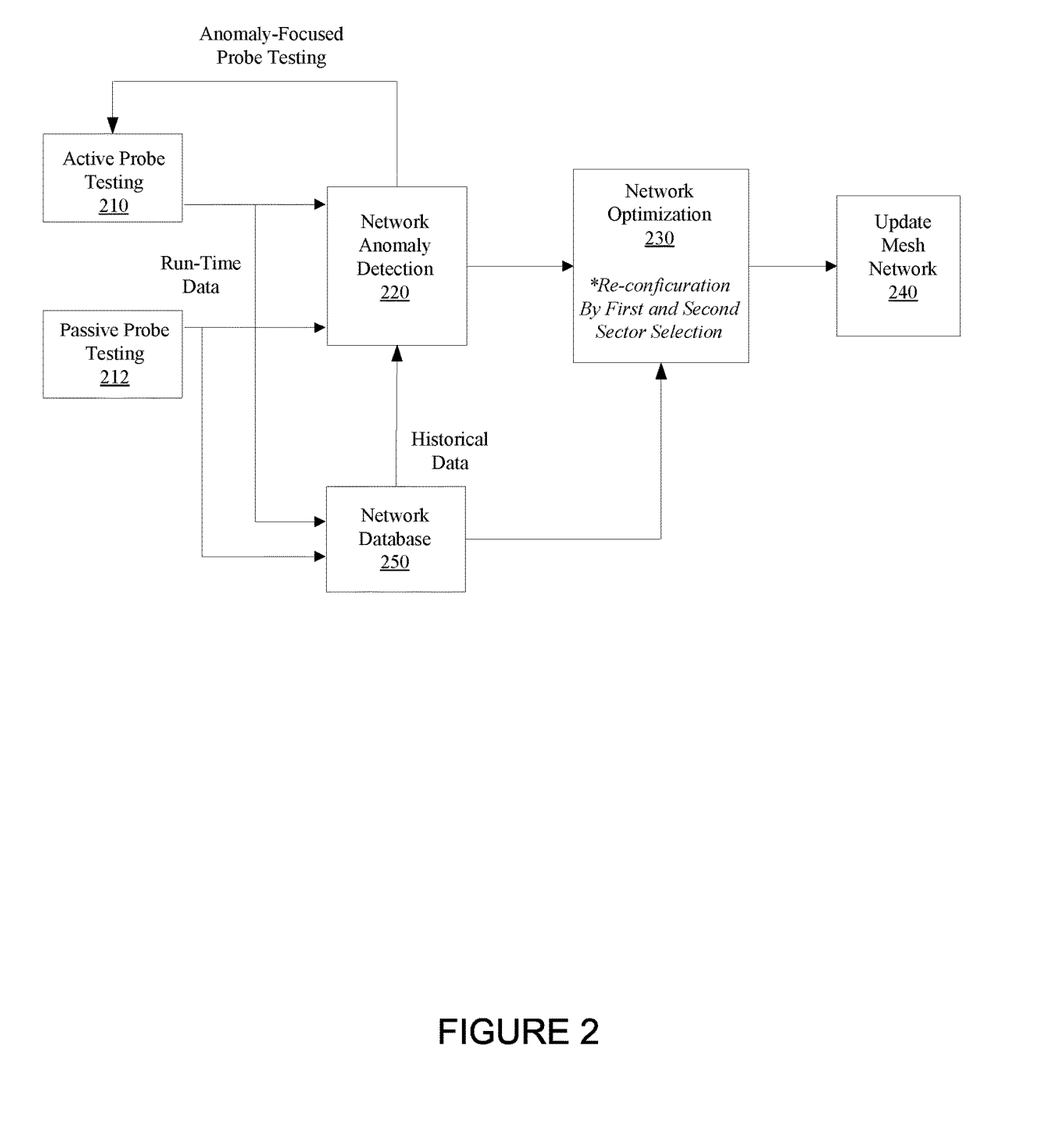
FIG. 2 shows a wireless network that includes anomaly detection, network monitoring, and network characterizing, according to an embodiment.

FIG. 2 shows a wireless network that includes anomaly detection, network monitoring, and network characterizing, according to an embodiment. For at least some embodiment, monitoring the network includes monitoring power levels of signals communicated between nodes of the wireless network including received signal powers. Further, at least some embodiments include monitoring parameters related to the signal-to-noise ratio (SNR) of the communicated signals, such as, SINR, PER, BER, or other signal interference measures. As previously described, wireless mesh networks include a large number of proximate wireless links, and accordingly, interference between the wireless links is likely. Further, wireless mesh networks that operate on a common or near-common communication channel are particularly susceptible to interference between the wireless links.

For at least some embodiment, the monitoring of the network includes monitoring at a higher network level (that is, at a higher Open Systems Interconnection (OSI) level). For example, the monitoring can include identifying congestion or large propagation times within the wireless mesh network. The identified congestion or propagation times can be an indication of wireless links that are compromised due to interference.

FIG. 2 shows a network anomaly (condition) detection block 220. For at least some embodiments, this detection block 220 functions to provide anomaly detection as well as root cause analysis. At least some embodiments of the anomaly detection include identifying indicators or metrics that indicate poor wireless network performance, such as bad (low) throughput, latency, PER, SINR, interference. For an embodiment, a root cause analysis includes identify causes of the indicators or metric of poor performance, such as, due to blockage such as foliage, a wall, etc., or due to high interference. The network anomaly detection can include detecting wireless links within the wireless mesh network that are subject to more interference than other wireless links of the wireless mesh network, or wireless links that suffer interference above a selected threshold. Once the interference of a wireless link has been characterized or identified, a network optimization block 230 identifies adjustments that can be made to the operation of the wireless mesh network (update mesh network 240) to mitigate the interference condition(s).

For an embodiment, the nodes of the wireless mesh network include one or more sectors, wherein each sector includes a radio (including base band processing, frequency up-conversion (for transmission) or frequency down-conversion (for reception)) and associated antennas operative to transmit or receive wireless signals to or from another wireless node or wireless device. Each sector includes one or multiple antennas or antenna arrays that form directional beams. The nodes of the wireless network can include one or more sectors. As previously described, for an embodiment, a plurality of the sectors includes at least two operative modes. The sectors operating in the first mode are configured to simultaneously transmit wireless signals or simultaneously receive wireless signals, sectors operating in the second mode are configured to simultaneously transmit wireless signals when all of the first plurality of sectors operating in the first mode are receiving wireless signals, or simultaneously receive wireless signals when all of the first plurality of sectors operating in the first mode are transmitting wireless signals.

For at least some embodiments, the adjustments provided by the network optimization block 230 to update operation of the mesh network 240 include selecting which sectors of the wireless mesh network operate in the first mode, and which of the sectors of the wireless mesh network operate in the second mode. Once selected, the mode selections are assigned or reassigned to each of the sector, and each sector then operates in the first mode or the second mode as assigned. Further, for at least some embodiments, the adjustments provided by the network anomaly (condition) network optimization block 230 to update operation of the mesh network further includes selecting a timing of when the sectors of the first and second modes are transmitting signals or receiving signals.

For an embodiment, the duty cycle between transmitting and receiving for each sector is selectable. For an embodiment, the timing between transmitting and receiving for each sector is adaptively selected. For at least some embodiment, selecting the timing include analyzing the number of links the link associated with the sector is interfering with, or the number of links which interferes this link. For at least some embodiments, the timing selection is a joint decision (joint because the effect on a plurality of links is considered) to mitigate the interferences across links. For an embodiment, the timing between transmitting and receiving for each sector is adaptively selected based upon determined uplink and downlink traffic of the sectors of the nodes of the wireless mesh network. For example, certain links can be observed to have predominately downlink traffic, and the timing between transmitting and receiving for each sector can be selected accordingly. Correspondingly, certain links can be observed to have predominately uplink traffic, and the timing between transmitting and receiving for each sector can be selected accordingly.

For an embodiment, determination of which wireless links between sectors of nodes of the wireless mesh network are interfering links is aided by probe testing. For an embodiment, a probe is a signal that is transmitted through a wireless link. The transmitted probe can be detected elsewhere within the wireless mesh network to determine if the wireless link the probe was transmitted through is an interfering wireless link, and/or for determining whether a wireless link that receives the probe is an interfered wireless link.

As shown in FIG. 2, one type of testing that utilizes a probe includes active probe testing, and another type of testing that utilizes a probe includes passive probe testing. Generally, passive probe testing includes using normal operating network communication to test whether particular links are interfering link. E.g., the normal operating network communication can include the regular measurements such as RSSI, SINR, PER, etc., as well as the log of the configurations such as TX power, then based on these time series of the measurements and configurations, the monitoring and analysis are done. Active probe testing includes generating probe signals specifically for identifying interfering links. For an embodiment, a timing of the use of the active probes is strategically selected to have minimal or no impact on the operation of the wireless network. For example, during a period of time at night (e.g., at night shift) or at some non-extremely busy time, spare resources can be utilized to inject the probing signals (such as some dummy traffic, using e.g., TCP/IP, or UDP) to be transmitted across links to test out the interferences.

For at least some embodiments, the network anomaly (condition) detection block 220 receives run-time data generated based on the active probe and/or the passive probe testing. Further a network database 250 is populated based on the run-time data. Further, for an embodiment, the network anomaly (condition) detection block 220 receives or accesses historical data of the wireless network from the network data base 250. For an embodiment, the network database stores data according to one or multiple time scales, such as second level, tens of second level, minutes level, etc. For an embodiment, some of the data samples are periodic, and some of the data samples are event based. For an embodiment, the database stores data that is preprocessed from the raw data collected, in addition to the collected raw data. For an embodiment, the preprocessing includes, for example, data cleaning, such as, removal of some outliers. For an embodiment, the preprocessing includes data aggregation, such as aggregating in time, in space, in links (such as aggregating over multiple links on a route), etc.

Figure 3:
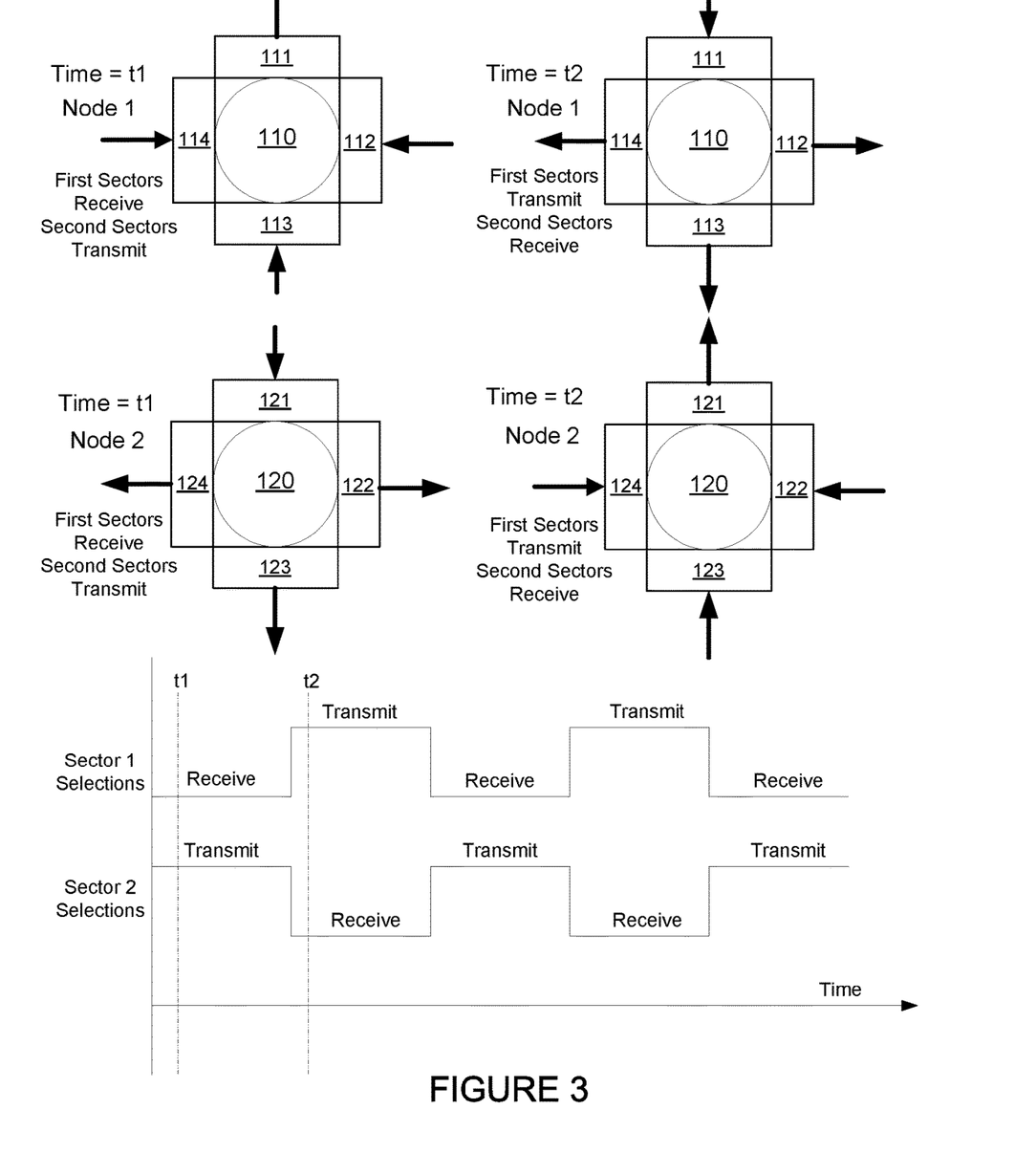
FIG. 3 shows a couple of nodes of a wireless network, wherein sectors of the nodes are designated as first and second sectors over time, according to an embodiment.

FIG. 3 shows a couple of nodes 110, 120 of a wireless mesh network, wherein sectors of the nodes 110, 120 are designated as first and second sectors over time, according to an embodiment. A first wireless node 110 includes sectors 111, 112, 113, 114, and a second wireless node 120 includes sectors 121, 122, 123, 124. As previously described, an embodiment includes assigning each of the plurality of sectors 111, 112, 113, 114, 121, 122, 123, 124 to operate in a first mode or a second mode.

As shown, for the first node 110, sectors 112, 113, 114 are selected to operate in a first mode, and accordingly, simultaneously receive wireless signals at a first point in time t1. Further, the first node 110 includes a sector 111 that is selected to operate in a second mode, and accordingly transmits a wireless signal while the sectors 112, 113, 114 simultaneously receive wireless signals at the first point in time t1.

Further, as shown at a different point in time t2, the sectors 112, 113, 114 of the first node 110 that are operating in the first mode simultaneously transmit wireless signals while the sector 111 operating in the second mode receives a wireless signal.

FIG. 3 also shows a second node 120 that includes sectors 122, 123, 124 that are selected to operate in the second mode. Accordingly, during the time t1, the sectors 122, 123, 124 simultaneously transmit signals while the sector 121 that is operating in the second mode receives wireless signals.

FIG. 3 also shows an exemplary time-line that depicts operation of the sectors selected to operate in the first mode, and the sectors selected to operate in the second mode. As described, the sectors 112, 113, 114, 121, selected to operate in the first mode receive wireless signals at the time t1 and the sectors 111, 122, 123, 124, selected to operate in the second mode transmit wireless signals at the time t1. Further, the sectors 112, 113, 114, 121, selected to operate in the first mode simultaneously transmit wireless signals at the time t2 and the sectors 111, 122, 123, 124, selected to operate in the second mode simultaneously receive wireless signals at the time t2.

Figure 4:
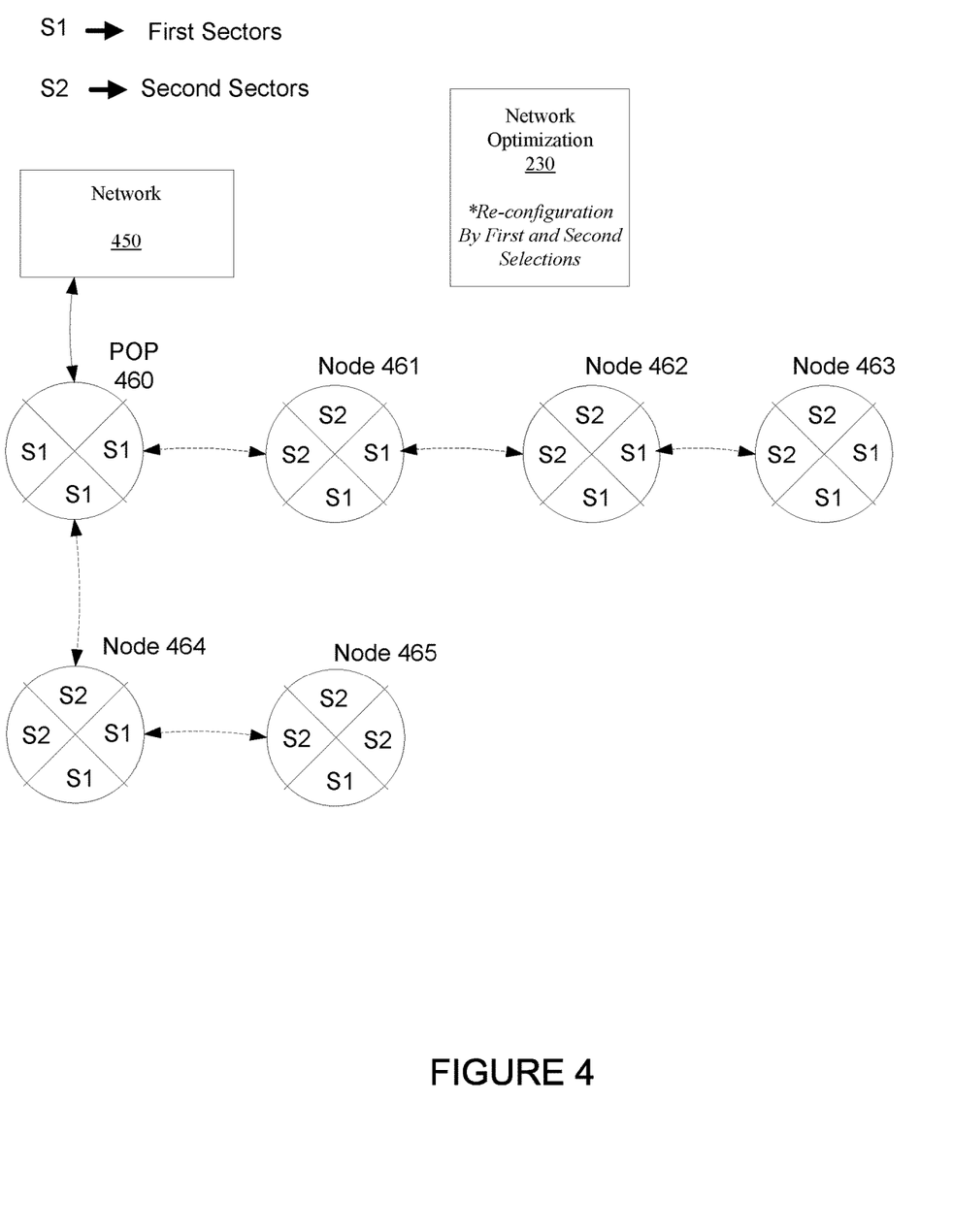
FIG. 4 shows a wireless mesh network that includes nodes having sectors designated as first and second types of sectors, according to an embodiment.

It is to be understood that the mode control time-line of FIG. 3 is merely an example. The changes in the operation of the sectors operating in the first mode and the operation of the sectors operating in the second mode can change at any rate, and the change does not have to be periodic. As previously stated, all the sectors operating in the first mode are configured to simultaneously transmit wireless signals or simultaneously receive wireless signals. Further, all of the sectors operating in the second mode are configured to simultaneously transmit wireless signals when all of the first plurality of sectors operating in the first mode are receiving wireless signals, or simultaneously receive wireless signals when all of the first plurality of sectors operating in the first mode are transmitting wireless signals FIG. 4 shows a wireless mesh network that includes nodes having sectors designated as first and second types of sectors, according to an embodiment. For this exemplary configuration of a plurality of wireless nodes 460, 461, 462, 463, 464, 465 some sectors of the plurality of nodes 460, 461, 462, 463, 464, 465 are selected to operate in the first mode (S1) and some sectors of the plurality of nodes 460, 461, 462, 463, 464, 465 are selected to operate in the second mode (S2). As depicted, sectors operating in the first mode are coupled to communicate with a sector operating in the second mode.

FIG. 4 shows the network optimization block 230. The operation of the network optimization block 230 can be centralized at a central network controller, or can be distributed across the nodes (sectors) of the wireless network. For at least some embodiments, the central network controller operates to select the modes (mode 1, mode 2) of the sectors of the wireless network. For at least some embodiments, the central network controller further operates to select the timing of transmission and reception of the modes (mode 1, mode 2) of the sectors of the wireless network. For at least some embodiments, the central network controller further operates to rank wireless links associated with the sectors of the nodes of the wireless network, and bases the mode selections, and the timing of the transmission and reception of the modes based at least in part on the rankings of the wireless links associated with the sectors. For an embodiment, sectors associated with a lower ranked wireless links are updated before sectors associated with higher ranked wireless links.

Figure 5:
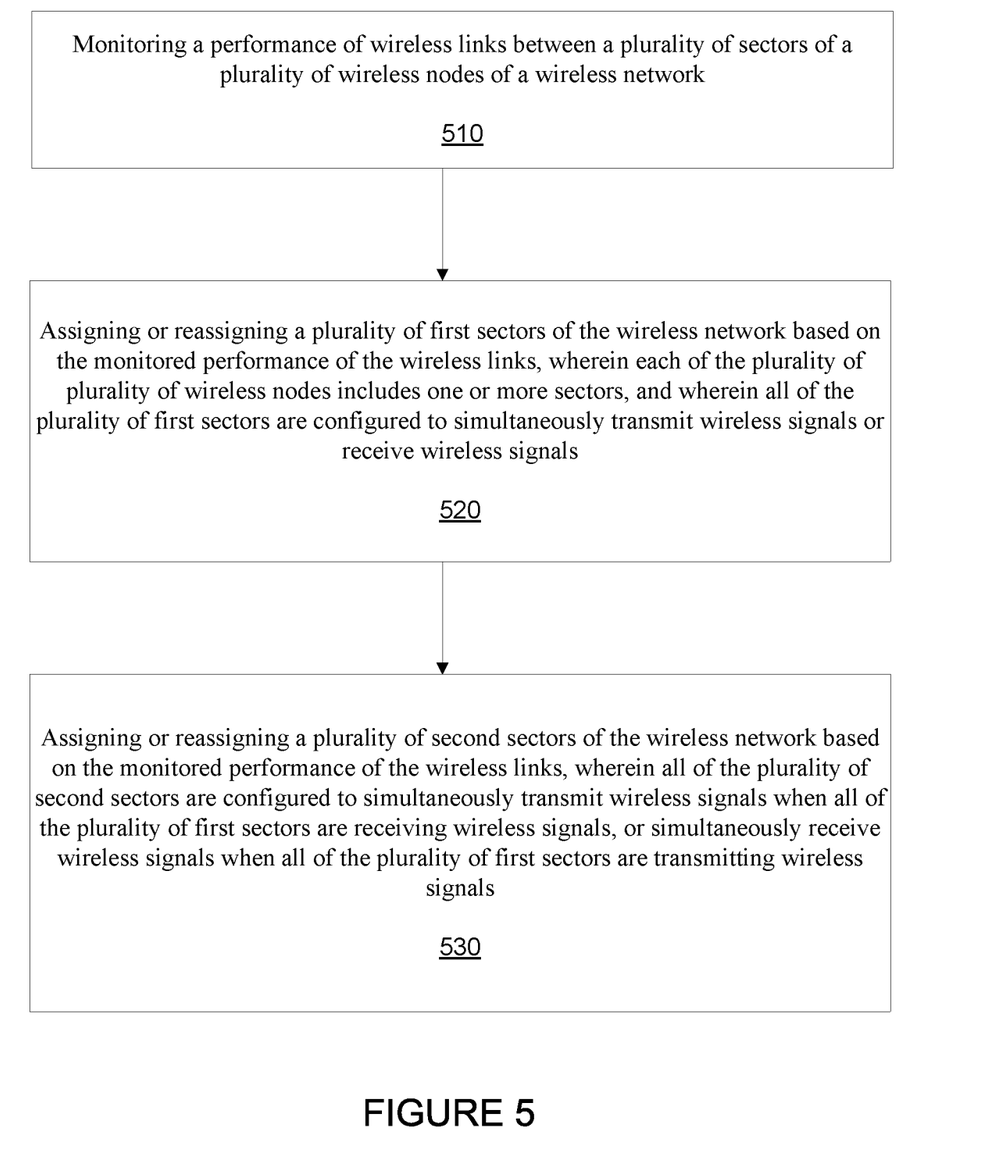
FIG. 5 is a flow chart that includes steps of a method of monitoring a wireless network and designating first and second types of sectors, according to an embodiment.

FIG. 5 is a flow chart that includes steps of a method of monitoring a wireless network and designating first and second types of sectors, according to an embodiment. A first step 510 includes monitoring a performance of wireless links between a plurality of sectors of a wireless network. A second step 520 includes assigning or reassigning a first plurality of sectors of the wireless network to operate in a first mode based on the monitored performance of the wireless links, wherein all of the first plurality sectors operating in the first mode are configured to simultaneously transmit wireless signals or simultaneously receive wireless signals. A third step 530 includes assigning or reassigning a second plurality of sectors of the plurality of wireless nodes of the wireless network to operate in a second mode based on the monitored performance of the wireless links, wherein all of the second plurality of sectors operating in the second mode are configured to simultaneously transmit wireless signals when all of the first plurality of sectors operating in the first mode are receiving wireless signals, or simultaneously receive wireless signals when all of the first plurality of sectors operating in the first mode are transmitting wireless signals.

For at least some embodiments, monitoring of the performance of the wireless links of the wireless network includes monitoring a level of interference between the wireless links. Numerous different methods can be used to monitoring levels of interference between wireless links. For example, at least some embodiments include monitoring parameters related to the signal-to-noise ratio (SNR) of the communicated signals, such as, SINR, PER, BER, or other signal interference measures. As previously described, wireless mesh networks include a large number of proximate wireless links, and accordingly, interference between the wireless links is likely. Further, wireless mesh networks that operate on a common or near-common communication channel are particularly susceptible to interference between the wireless links.

For at least some embodiment, the monitoring of the network includes monitoring at a higher network level (that is, at a higher Open Systems Interconnection (OSI) level). For example, the monitoring can include identifying congestion or large propagation times within the wireless mesh network. The identified congestion or propagation times can be an indication of wireless links that are compromised due to interference.

For an embodiment, monitoring the performance of the wireless links includes identifying interference patterns within received signals of at least some of the plurality of nodes, and identifying most likely interfering links based on the identified interference patterns. That is, interference can be monitored over time. For an embodiment, patterns can be identified within the monitored interference. Base on the identified patterns within the monitored interference, determinations of interfering links can be made.

As previously described, after attempting to identify interfering links, confirmation of whether a wireless link is in fact an interfering link can be made by using probe signals. That is, candidate interfering links are identified, and then the candidate interfering links can be tested to confirm whether the candidate links are actually interfering links through the use of probe testing. An embodiment includes controlling sectors of wireless nodes associated with the most likely interfering links to transmit probe packets at specified times. For an embodiment, the probes packets are easily identifiable, and allow a receiver to identify where received probe packets came from, and therefore, allow for determination or confirmation of interfering links. For instance, probing can be utilized for interference measurements and monitoring. For example, the serving transmitter does not send traffic to the targeted receiver in a certain time frame, then the targeted receiver in this time frame does not listen to the traffic from the serving transmitter, rather, listening to the signals from a certain interferer, hence the interference from the interferer is measured.

For an embodiment, sectors that are most likely to be interfered with perform a scan to determine whether the sectors can receive a probe signal. That is, an embodiment includes controlling one or more sectors of wireless nodes associated with most likely interfered links to scan for reception of the probe packets at the specified times. Further, interfering links are identified based on the reception of the probe packets.

Once interfering links have been identified, at least some embodiments include assigning sectors to operate in first and second modes based on the identifications. That is, for an embodiment, the first plurality of sectors of the wireless nodes of the wireless network are assigned or reassigned to operate in the first mode based on the identified interfering links, and the second plurality of sectors of the wireless nodes of the wireless network are assigned or reassigned to operate in the second mode based on the identified interfering links. The mode assignment is made to reduce or minimize interference between the wireless links.

At least some embodiments further include ranking interfered links, and wherein the first plurality of sectors operating in the first mode and the second plurality of sectors operating in the second mode are assigned to mitigate interference with the interfered links based on the rankings of interfered links. For an embodiment, sectors that are associated with lower ranked links are more likely to have their mode changed if identified as an interfering link. Higher ranked links are less likely to have their mode updated or changed.

For an embodiment, interfered links of wireless nodes located a fewest number of wireless hops from a point-of-presence node are ranked the highest. Higher ranked links and the links who create interferences to the higher ranked links are selected first for reconfigurations or the mode selection. And it continues towards lower ranked ones.

For an embodiment, interfered links are ranked based characteristics of data traffic propagating through links being interfered by the interfering links. Characteristics of data traffic include, for example, bursty data traffic, and/or continuous steady flowing traffic. For an embodiment, busier links (links with more data traffic) are ranked than less busy links. For an embodiment, links with more bursty links (the links with a higher maximum data rate over a certain time window) are ranked higher than less bursty links.

For an embodiment, interfered links are ranked based by a number of downstream users that rely on the interfered link. That is, the more downstream users, the more influence the interfered link has on the performance of the network. That is, if such a link is interfered with, a large number of users of the wireless network are affected. A link closer to a pop node can typically serve more end users, hence it is ranked higher.

For an embodiment, interfering links are ranked based on an estimated number of links that are interfered by the interfering link. That is, the more wireless links that are interfered with due to a particular interring wireless link, the greater the impact on the wireless network.

At least some embodiments, further include using the monitored interference to adaptively select timing of transmission and reception of the first plurality of nodes operating in the first mode and the second plurality of nodes operating in the second mode.

Although specific embodiments have been described and illustrated, the embodiments are not to be limited to the specific forms or arrangements of parts so described and illustrated. The described embodiments are to only be limited by the claims.

What is claimed:

1. A method, comprising:
   monitoring a performance of wireless links between a plurality of sectors of a plurality of wireless nodes of a wireless network, comprising
      identifying interference patterns within received signals of at least some of the plurality of wireless nodes comprising monitoring interference over a period of time; and
      identifying most likely interfering links based on the identified interference patterns;
   assigning or reassigning a first plurality of sectors of the wireless network to operate in a first mode based on the monitored performance of the wireless links, wherein all of the first plurality sectors operating in the first mode are configured to simultaneously transmit wireless signals or simultaneously receive wireless signals; and
   assigning or reassigning a second plurality of sectors of the wireless network to operate in a second mode based on the monitored performance of the wireless links, wherein all of the second plurality of sectors operating in the second mode are configured to simultaneously transmit wireless signals when all of the first plurality of sectors operating in the first mode are receiving wireless signals, or simultaneously receive wireless signals when all of the first plurality of sectors operating in the first mode are transmitting wireless signals.

2. The method of claim 1, wherein the monitoring of the performance of the wireless links of the wireless network includes monitoring a level of interference between the wireless links.

3. The method of claim 2, further comprising using the monitored interference to adaptively select timing of transmission and reception of the first plurality of nodes operating in the first mode and the second plurality of nodes operating in the second mode.

4. The method of claim 1, further comprising controlling sectors of wireless nodes associated with the most likely interfering links to transmit probe packets at specified times.

5. The method of claim 4, further comprising controlling one or more sectors of wireless nodes associated with most likely interfered links to scan for reception of the probe packets at the specified times.

6. The method of claim 5, further comprising identifying interfering links based on the reception of the probe packets.

7. The method of claim 6, wherein:
   the first plurality of sectors of the wireless nodes of the wireless network are assigned or reassigned to operate in the first mode based on the identified interfering links; and
   the second plurality of sectors of the wireless nodes of the wireless network are assigned or reassigned to operate in the second mode based on the identified interfering links.

8. The method of claim 6, further comprising ranking interfered links, and wherein the first plurality of sectors operating in the first mode and the second plurality of sectors operating in the second mode are assigned to mitigate interference with the interfered links based on the rankings of interfered links.

9. The method of claim 8, wherein interfered links of wireless nodes located a fewest number of wireless hops from a point-of-presence node are ranked the highest.

10. The method of claim 8, wherein interfered links are ranked based characteristics of data traffic propagating through links being interfered by the interfering links.

11. The method of claim 8, wherein interfered links are ranked based by a number of downstream users that rely on the interfered link.

12. The method of claim 8, wherein interfering links are ranked based on an estimated number of links that are interfered by the interfering link.

13. A wireless network, comprising:
   a plurality of wireless nodes;
   a controller operative to:
   monitor performances of wireless links between sectors of the plurality of wireless nodes of the wireless network, comprising
      identifying interference patterns within received signals of at least some of the plurality of wireless nodes comprising monitoring interference over a period of time; and
      identifying most likely interfering links based on the identified interference patterns;
   assign or reassign a first plurality of sectors of the plurality of wireless nodes of the wireless network to operate in a first mode based on the monitored performance of the wireless links, wherein all of the first plurality of sectors operating in the first mode are configured to simultaneously transmit wireless signals or receive wireless signals;
   assign or reassign a second plurality of sectors of the plurality of wireless nodes of the wireless network to operate in a second mode based on the monitored performance of the wireless links, wherein all of the second plurality of sectors operating in the second mode are configured to simultaneously transmit wireless signals when all of the first plurality of sectors operating in the first mode are receiving wireless signals, or receive wireless signals when all of the first plurality of sectors operating in the first mode are transmitting wireless signals.

14. The wireless network of claim 13, wherein the controller is further operative to monitor the performance of the wireless links of the wireless network includes monitoring a level of interference between the wireless links.

15. The wireless network of claim 14, further comprising controlling sectors associated with the most likely interfering links to transmit probe packets at specified times.

16. The wireless network of claim 15, further comprising controlling one or more sectors associated with most likely interfered links to scan for reception of the probe packets at the specified times.

17. The wireless network of claim 16, further comprising identifying interfering links based on the reception of the probe packets.

18. The wireless network of claim 14, further comprising using the monitored interference to adaptively select timing of transmission and reception of the first plurality of sectors operating in the first mode and the second plurality of sectors operating in the second mode.

* * * * *